US012782511B2

(12) United States Patent
Ghadiali

(10) Patent No.: US 12,782,511 B2
(45) Date of Patent: Nov. 3, 2026

(54) RADAR-BASED INPUT CONTROLS

(71) Applicant: Google LLC, Mountain View, CA (US)

(72) Inventor: Aditya Shailesh Ghadiali, San Jose, CA (US)

(73) Assignee: Google LLC, Mountain View, CA (US)

( * ) Notice: Subject to any disclaimer, the term of this patent is extended or adjusted under 35 U.S.C. 154(b) by 291 days.

(21) Appl. No.: 18/596,395

(22) Filed: Mar. 5, 2024

(65) Prior Publication Data

US 2024/0210524 A1 Jun. 27, 2024

Related U.S. Application Data

(60) Provisional application No. 63/559,685, filed on Feb. 29, 2024.

(51) Int. Cl.
*G01S 7/41* (2006.01)
*G01S 13/00* (2006.01)
*G06F 3/01* (2006.01)

(52) U.S. Cl.
CPC ............ *G01S 7/415* (2013.01); *G01S 13/003* (2013.01); *G06F 3/017* (2013.01)

(58) Field of Classification Search
None
See application file for complete search history.

(56) References Cited

U.S. PATENT DOCUMENTS

| | | | | |
|---|---|---|---|---|
| 12,353,638 | B1 * | 7/2025 | Hsu | G06F 17/142 |
| 2017/0329449 | A1 * | 11/2017 | Silverstein | G01S 13/42 |
| 2019/0012040 | A1 | 1/2019 | Lynn et al. | |
| 2020/0241672 | A1 * | 7/2020 | Kushnir | G01S 13/87 |
| 2021/0342008 | A1 * | 11/2021 | Sachidanandam | G06F 3/0346 |
| 2024/0369684 | A1 * | 11/2024 | Va | G01S 13/581 |

* cited by examiner

*Primary Examiner* — Olumide Ajibade Akonai
*Assistant Examiner* — Ashley Brown Raynal
(74) *Attorney, Agent, or Firm* — Colby Nipper PLLC

(57) ABSTRACT

An electronic device includes a radar input control system that can perform presence detection, as well as distinguish between touch input, gesture input, and/or potential docking devices. In implementations, the electronic device includes a plurality of radar reception antennas and at least one transmit channel that feeds a plurality of radar transmission antennas. One or more radar reception antennas of the plurality of radar reception antennas may correspond to a discrete input location on a surface of the electronic device. In this way, the electronic device can be implemented without mechanical switches or a touchscreen interface and still receive user input.

13 Claims, 9 Drawing Sheets

RADAR-BASED INPUT CONTROLS

CROSS-REFERENCE TO RELATED APPLICATION(S)

This application claims the benefit of U.S. Provisional Patent Application Ser. No. 63/559,685 filed on Feb. 29, 2024, the disclosure of which is incorporated by reference wherein in its entirety.

SUMMARY

This document describes systems and techniques directed at radar-based input controls for electronic devices. In aspects, an electronic device includes a radar input control system that can perform presence detection, as well as distinguish between touch input, gesture input, and/or potential docking devices. In implementations, the electronic device includes a plurality of radar reception antennas and at least one transmit channel that feeds a plurality of radar transmission antennas. One or more radar reception antennas of the plurality of radar reception antennas may correspond to a discrete input location on a surface of the electronic device. In this way, the electronic device can be implemented without mechanical switches or a touchscreen interface and still receive user input.

For example, a system includes at least one transmit channel feeding a plurality of radar transmission antennas. The system further includes a plurality of radar reception antennas, where one or more radar reception antenna of the plurality of radar reception antennas correspond to a discrete input region of a plurality of discrete input regions. Radar control circuitry is operatively coupled to the plurality of radar transmission antennas and the plurality of radar reception antennas. The radar control circuitry is configured to generate a transmission signal via the plurality of radar transmission antennas and to receive one or more reflections of the transmission signal via at least one radar reception antenna of the plurality of radar reception antennas. The one or more reflections of the transmission signal may be reflected from at least one object. The radar control circuitry is also configured, in response to the receipt of the one or more reflections, to analyze the one or more reflections of the transmission signal. Based on the analysis of the one or more reflections, the radar control circuitry is configured to determine whether the object comprises a hand of a user or an electronic device (e.g., a docking device). Responsive to a determination that the one or more reflections are indicative of the hand of the user, the radar control circuitry is configured to recognize a gesture performed by the user based at least in part on a spatial location of the gesture relative to a respective discrete input region of the plurality of discrete input regions and to cause an action to be performed in response to the recognition that the gesture is indicative of a user command to perform a function associated with the gesture.

This Summary is provided to introduce systems and techniques directed at radar-based input controls for electronic devices, as further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques for providing an electronic control system with a radar input control system to receive input from a user are described in this document with reference to the following drawings. The same numbers are used throughout the drawings to reference like features and components.

DETAILED DESCRIPTION

Overview

Figure 1:
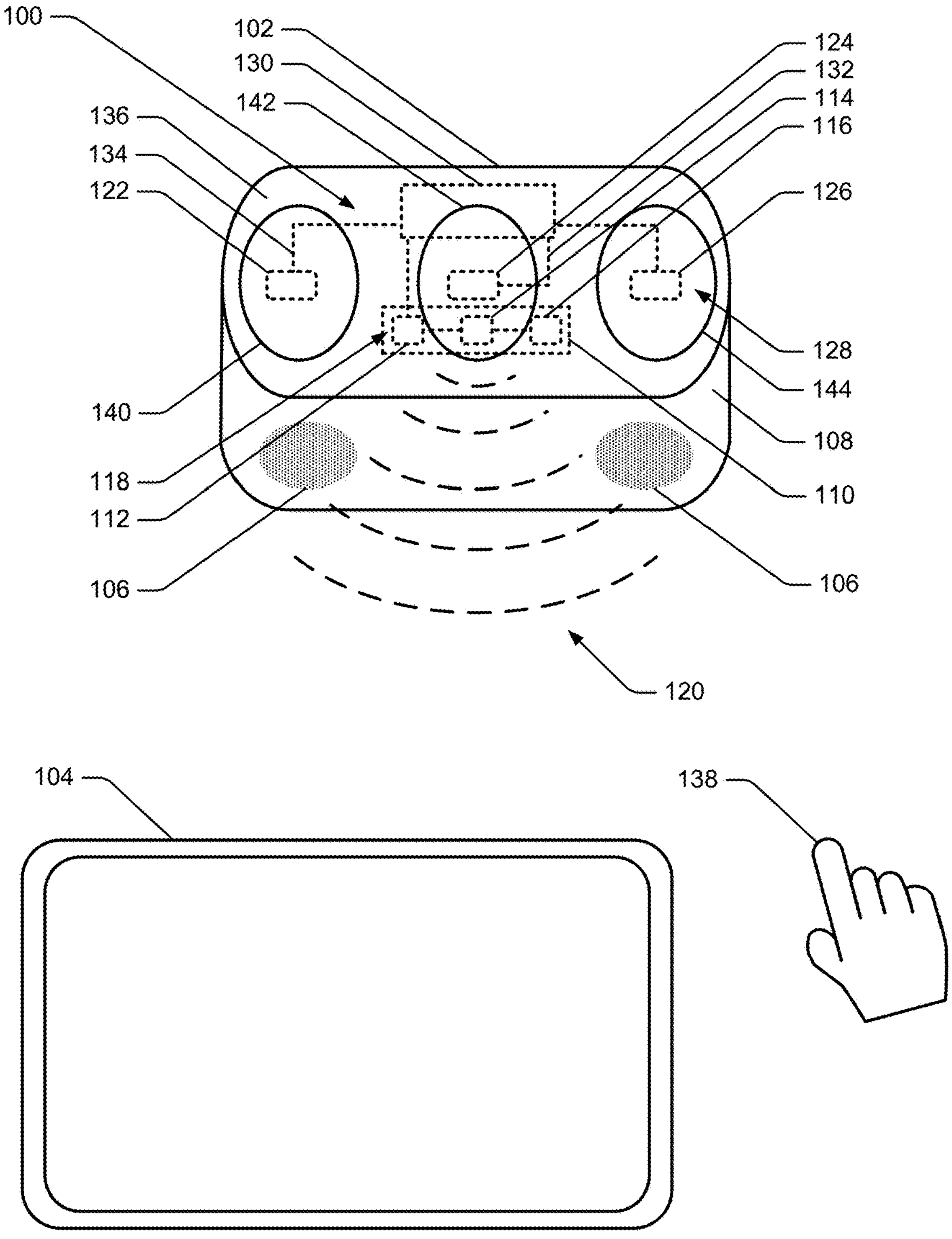
FIG. 1 illustrates a schematic diagram of an electronic device including a radar input control system.

Electronic devices employ a wide range of input technologies, including mechanical switches, touchscreen interfaces, infrared sensors, magnetic sensors, and other input technologies. Each input technology may have advantages, while possessing some disadvantages. For example, mechanical switches represent a simple, energy-efficient, and reliable technology. However, mechanical systems take up space, generally require housings be configured to receive them, tend to trap dirt and debris, and are subject to mechanical degradation. Touchscreen interfaces, on the other hand, are sleek, user-friendly, durable, and reconfigurable to suit changing application needs. Yet, touchscreen interfaces are comparatively more expensive, electrically complex, and subject to damage from impacts to the touchscreen surface. In addition, conductive or semi-conductive interface surfaces may be subject to electrostatic discharge that can damage electronics or cause discomfort to the user.

Less commonly-used technologies also have disadvantages. For example, while infrared sensors may be responsive to body heat to enable detection of user contact and/or user gestures, infrared sensors may incorrectly read proximity to a heat source (e.g., due to sunlight) or may not be responsive to a gloved hand. Magnetic-sensing technology, on the other hand, provides a relatively simple, inexpensive technology. However, a device using magnetic sensing must accommodate one or more magnets or magnetic sensors. As a result, speakers or other components in proximity to the magnets or magnetic sensors may have to be calibrated or reconfigured to not be disrupted by the magnets or magnetic sensors.

In contrast to the aforementioned input technologies, a radar input control system may respond to user gestures without the cost, complexity, or fallibility of mechanical switches, touchscreens, infrared sensors, or magnetic sensors. Until recently, radar-based control in consumer products was limited due to the frequency range needed to effect short-range tracking and differentiation of objects. However, in 2023, the U.S. Federal Communications Commission changed its regulations to permit unlicensed use of radar devices in the so-called 60 GHz band (at 57-71 GHz). Radar-input control systems operating in this frequency/wavelength range can detect and differentiate gestures to control electronic devices.

This document describes systems and techniques directed at radar-based input controls for electronic devices. In aspects, an electronic device includes a radar input control system that can perform presence detection, as well as distinguish between touch input, gesture input, and/or potential docking devices. In implementations, the electronic device includes a plurality of radar reception antennas and at least one transmit channel that feeds a plurality of radar transmission antennas. One or more radar reception antennas of the plurality of radar reception antennas may correspond to a discrete input location on a surface of the electronic device. In this way, the electronic device can be implemented without mechanical switches or a touchscreen interface and still receive user input.

Example System Using a Radar Input Control System

FIG. 1 illustrates a radar input control system 100 implemented in an electronic device 102. In the example of FIG. 1, the electronic device 102 is a docking station for a tablet 104 or another electronic device. The electronic device 102 may provide support features for the tablet 104, such as magnetically-inductive charging for the tablet 104, and cooperative features such as an audio streaming system (represented in FIG. 1 by audio output devices 106, such as speakers) for audio signals generated by the tablet 104 or another source of audio signals via Bluetooth or another communications technology.

The electronic device 102 contains the radar input control system 100 within a housing 108. The radar input control system 100 includes at least one transmission antenna 110. In implementations, the at least one transmission antenna 110 includes three antenna segments 112, 114, and 116. Each of the segments 112, 114, and 116 may include a distinct patch antenna. Further, in some implementations, each of the segments 112, 114, and 116 can be spaced apart in a linear array 118 and configured to generate a single transmission signal 120 or multiple transmission signals (not illustrated). The transmission signal 120, which may be generated as a single frequency-modulated continuous wave, facilitates granular distance determination across a dimension transverse to the linear array 118. The radar input control system also includes a plurality of radar reception antennas 122, 124, and 126, also arranged in a linear array 128, and radar control circuitry 130. The radar control circuitry 130 supports at least one transmit channel 132 that feeds the transmission signal 120 to the at least one transmission antenna 110 or, in other implementations including a plurality of transmission antennas as described below. The radar control circuitry 130 also includes and at least one receive channel 134 that receives signals from the plurality of reception antennas 122, 124, and 126. The transmission antenna 110, the radar reception antennas 122, 124, and 126, and the radar control circuitry 130 are shown in dotted lines in FIG. 1 to reflect that the components are contained within the housing 108 of the electronic device 102.

In implementations, the antennas 110, 122, 124, and 126 are positioned behind a surface 136 of the housing 108 of the electronic device 102. The surface 136 may be formed of a nonconductive material, such as plastic or ceramic because, as further described below, receiving user input does not rely on a user's hand 138 making physical and/or electrical contact with the surface 136. Use of a nonconductive material in the surface 136 may help to avoid or reduce electrostatic discharge between the electronic device 102 and a user (not shown in FIG. 1).

The surface 136 may include a plurality of discrete input locations 140, 142, and 144 which a user can selectively engage with the hand 138 to control operations of the electronic device 102. The plurality of discrete input locations 140, 142, and 144 may be visually identified on the surface 136 of the housing 108. The discrete input locations 140, 142, and 144 may correspond to different user commands or inputs, such as audio controls to decrease or increase volume, to pause or resume play of content, or other functions as described by way of example below. In implementations, the discrete input locations 140, 142, and 144 may be spaced apart at a distance to enable the radar control circuitry 130 to differentiate between what input is intended by the user. The radar input control system 100 is configured to determine when the hand 138, by touching or coming within sufficient proximity to the surface 136 to manifest the user's intent to make a gesture to present an input associated with one or more of the discrete input locations 140, 142, and 144.

In operation, generally, the radar input control system 100 generates the transmission signal 120 (shown in dashed lines in FIG. 1) from the radar control circuitry 130 via the transmission channel 132 and the transmission antenna 110. The transmission signal 120 may result in one or more reflections (not shown in FIG. 1) when an object, such as the tablet 104 or the hand 138 is within a proximity of the electronic device 102. As described further below, the reflections from the object are received by the different reception antennas 122, 124, and 126. In response to receipt of the reflections, the radar control circuitry 130 analyzes the one or more reflections of the transmission signal 120. Based on the analysis of the one or more reflections, the radar control circuitry 130 determines whether the object comprises the hand 138 of the user or an electronic device, such as the tablet 104. Responsive to a determination that the one or more reflections are indicative of the hand of the user 138, the radar control circuitry 130 determines whether the hand of the user 138 performs a gesture based at least in part on a spatial location of the gesture relative to one or more discrete input locations 140, 142, and 144. In response to determination of the gesture, the radar control circuitry 130 then may cause an action to be performed where the gesture is indicative of a user command to perform a function associated with the gesture.

The reflections received via one or more of each of the reception antennas 122, 124, and 126. The reflections received may vary in strength, the differences in strength being indicative of the spatial location of the user's hand 138 or other object, such as a relative distance of the object from the reception antennas 122, 124, and 126 and/or the size of the object from which the reflections originate. According to the Doppler effect, the reflections received at each of the reception antennas 122, 124, and 126 may also vary in frequency if the object from which the reflections originate is moving. For example, if the object is moving away from the reception antenna 122 and toward the reception antenna 126, a frequency of the reflections received at the reception antenna 122 will be lower than a frequency of the reflections received at the reception antenna 126. Thus, an object moving relative to the electronic device 102 may represent a different input than touching one of the discrete input locations 140, 142, and 144, as described further below.

Figure 2A:
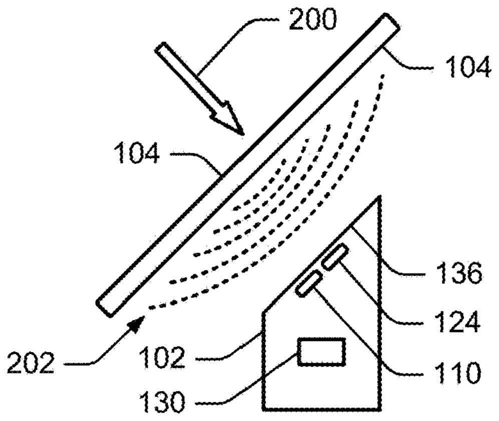
FIGS. 2A-2C illustrate partial cross-sectional diagrams of the electronic device including the radar input control system of FIG. 1 responding to objects in proximity of the electronic device.
Figure 2B:
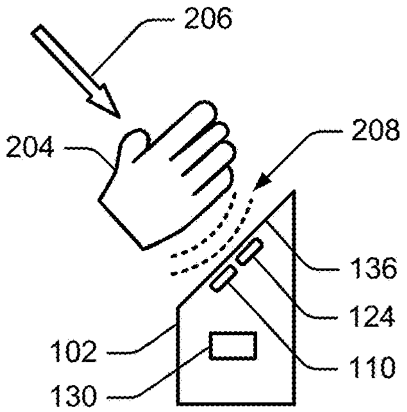
Figure 2C:
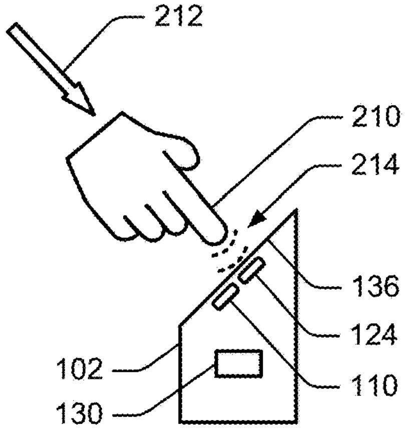

FIGS. 2A-2C illustrate partial cross-sectional views of objects approaching the surface 136 of the electronic device

102 of FIG. 1 and interacting with the radar input control system 100. An object of the radar input control system 100 is to be able to differentiate between objects approaching or adjacent to the surface 136 to determine whether the presence or movement of the objects should be regarded as a gesture associated with an input. For example, FIG. 2A shows the tablet 104 being moved in a direction 200 toward the surface 136 of the electronic device 102 to dock the tablet 104 for wireless charging or other functions. The tablet 104 may be secured to the surface 136 mechanically and/or magnetically to maintain the tablet 104 in position over the electronic device 102, for example, to facilitate wireless charging of the tablet 104 from the electronic device 102.

A relative size (e.g., surface area) and/or material composition of the tablet 104 (e.g., reflectivity), as compared to the hand 138, results in the reception antennas 122, 124, and 126 (of which only the reception antenna 124 is shown in the partial cross-sectional view of FIG. 2A) receiving strong and/or similar reflections 202 from the tablet 104 which the radar control circuitry 130 may identify as indicative of a large and/or metallic object (consistent with a docking device, such as a tablet 104) approaching the surface 136 of the electronic device 102. In implementations, the radar control circuitry 130 may be configured not to respond to the approach of the tablet 104 or other large object. For example, in docking the tablet 104 with the electronic device 102, a user may not wish to present an input to change the volume of audio content being played through the electronic device 102. Thus, by identifying the approach of the tablet 104 or other large object, the radar control circuitry 130 may disregard the approach of the tablet 104 or other large object as not representing a gesture to which it should respond.

In implementations, in addition to disregarding reflections of the transmission signal 120 (see FIG. 1) that indicate the presence or approach of objects such as the tablet 104, the radar control circuitry 130 may be configured to disregard the presence or approach of other large objects as determinable from reflections of the transmission signal 120. For example, referring to FIG. 2B, the radar control circuitry 130 may be configured to disregard the approach of a palm 204 of a hand in a direction 206 toward the surface 136 of the electronic device 102. When the palm 204 is moved in a direction 206 toward the surface 136 of the electronic device 102, reflections 208 from the palm 204 are received by at least one of the reception antennas 122, 124, and 126. Although the reflections may not be as strong and consistent at each of the reception antennas 122, 124, and 126 as the reflections 202 from the tablet 104 as described with reference to FIG. 2A, the size of the approaching palm 204 as discerned by the radar control circuitry 130 may surpass a threshold size that the radar control circuitry 130 is configured to disregard as not presenting an intentional gesture signifying a user input.

Referring to FIG. 2C, by contrast, when a user extends a finger 210 in a direction 212 approaching the surface 136 of the electronic device 102, reflections 214 from the finger 210 may be differentiated by the reception antennas 122, 124, and 126 as a small object and determine that the reflections 214 are indicative of a gesture to which the radar input control system 100 should respond. Thus, the radar control circuitry 130 can recognize the gesture presented by the finger 210 and determine to which of the discrete input locations 140, 142, and 144 the finger 210 is directed, identify the corresponding input, and generate a signal indicating a particular output or change in output of the electronic device 102, as further described below. It should be noted that, in implementations, gestures presented by the palm 204 of the user's hand may be acceptable and the description of disregarding the approach of the palm 204 is presented solely for illustration of an object whose presence or movement may be disregarded by the radar input control system 100.

Figure 3A:
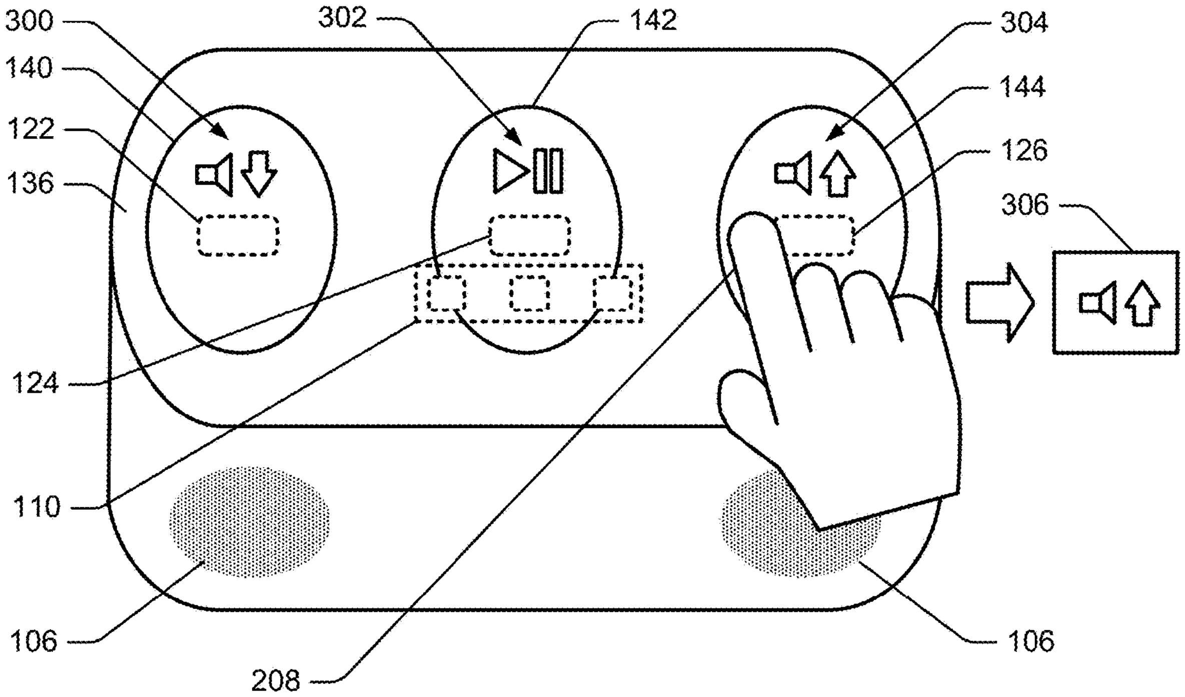
FIGS. 3A and 3B illustrate schematic diagrams of gestures directed to the electronic device of FIG. 1 to change an output of the electronic device of FIG. 1.

Referring to FIG. 3A, an enlarged view of the electronic device 102 shows the discrete input locations 140, 142, and 144 labeled with indicia 300, 302, and 304, respectively, which indicate to a user what function is associated with a gesture directed to each of the discrete input locations 140, 142, and 144. In the example of FIG. 3A, the indicator 300 associated with the discrete input location 140 represents a decrease volume function, the indicator 302 associated with the discrete input location 142 represents a play/pause function, and the indicator 304 associated with the discrete input location 144 represents a volume increase function. Thus, when a user touches one of the discrete input locations 140, 142, and 144, the radar control circuitry 130 directs a change in an output of the electronic device 102 corresponding to a function represented by which of the respective indicators 300, 302, or 304 is associated with a selected discrete input location. Using reflections of the transmitted signal generated by the at least one transmission antenna 110 detected by one or more of the reception antennas 122, 124, and 126, the radar control circuitry 130 determines which of the discrete input locations 140, 142, and 144 was engaged by the user.

Specifically, in the example of FIG. 3A, the finger 210 of the user's hand touches the discrete input location 144 labeled with the increase volume indicator 304. As a result, the reception antenna 126 may detect the strongest reflection (not shown in FIG. 3A) and thus recognize a gesture associated with a command to increase playback volume. Responsive to recognizing the gesture, the radar control circuitry 130 will generate an output 306 causing the electronic device 102 to increase the playback volume.

In addition to responding to gestures caused by a user tapping, touching, or reaching in proximity to one of the discrete input locations 140, 142, and 144, in implementations, the radar control circuitry 130 may identify gestures caused by movement of a finger or other object moving across the surface 136 of the electronic device. The radar control circuitry 130 may determine movement of an object as a result of frequency shifts in the reflections resulting from the Doppler effect.

Figure 3B:
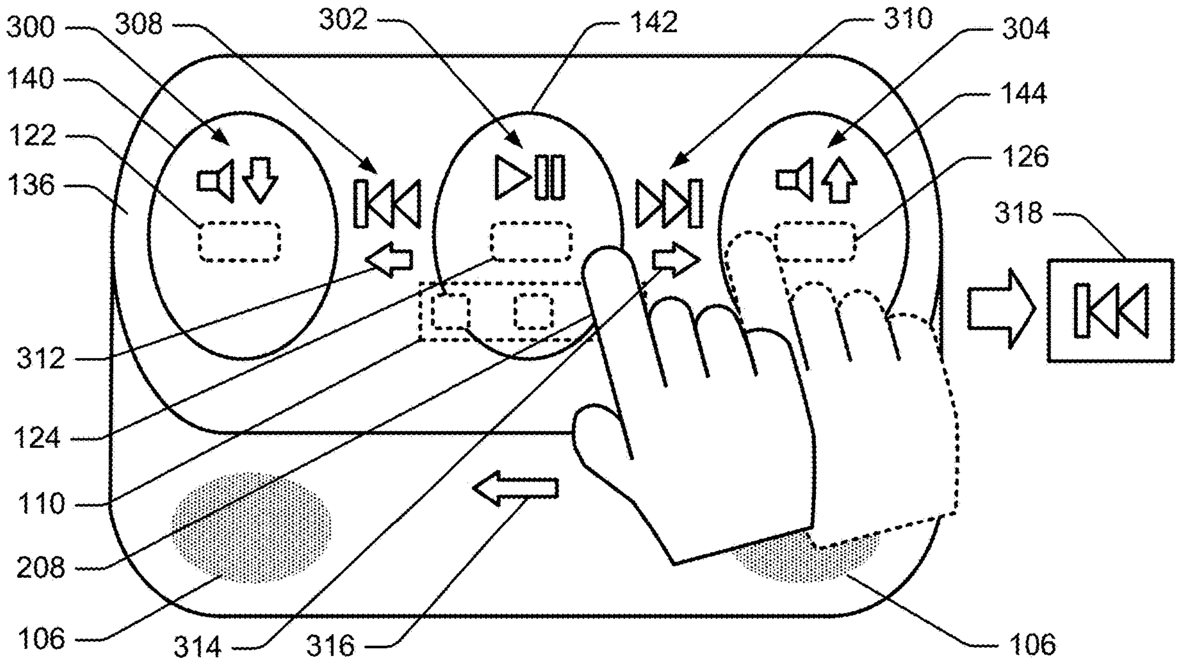

Referring to FIG. 3B, the surface 136 of the electronic device 102 bears additional indicia 308 and 310 to skip back to a start of a current track or previous track or to skip ahead to a next track, respectively. The skip back indicator 308 includes a left-facing arrow 312 indicating that a leftward gesture will invoke the skip back function and the skip ahead indicator 310 includes a right-facing arrow 314 indicating that a rightward gesture will invoke the skip ahead function. Thus, for example, when a user engages the input location 144 with the finger 210 and then moves the finger in a leftward direction 316 from its previous position (represented by a dotted outline in FIG. 3B), the radar control circuitry detects the change in frequency of the reflections from the finger 210 of the transmitted signal received at two or more of the reception antennas 122, 124, and 126 resulting from the movement of the finger 210 in the leftward direction 316. As a result, the radar control circuitry 130 will generate an output 318 to cause the electronic device 102 to skip back in playback of a media stream.

In addition to the above descriptions, although the three antenna segments 112, 114, and 116 are illustrated as positioned substantially in the center behind the surface 126 of the electronic device 102, this is illustrated as an example only. For, each of three antenna segments 112, 114, and 116 may be positioned next to a respective reception antenna 122, 124, and 126 and/or positioned behind an edge of the surface 126.

Evaluation of Reflections of Transmitted Signals to Identify Input Gestures

Figure 4A:
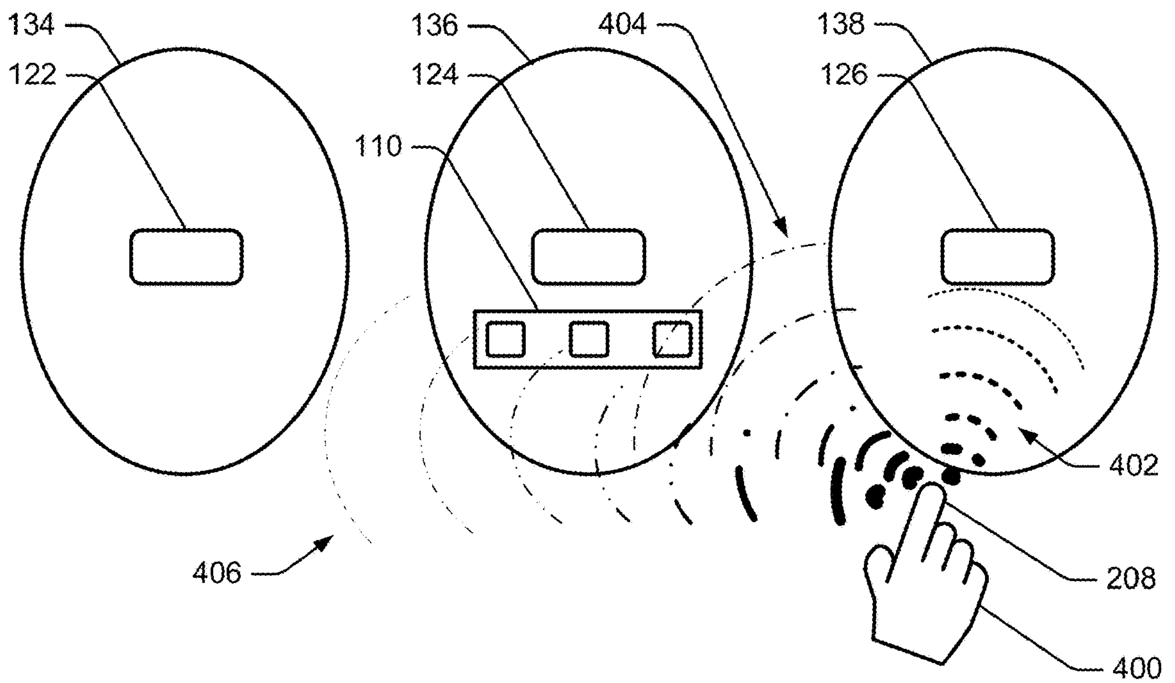
FIGS. 4A, 4B, 5A, and 5B illustrate schematic diagrams of reflections of transmitted radar signals detectable by the radar input control system resulting from gestures directed to the electronic device of FIG. 1.
Figure 4B:
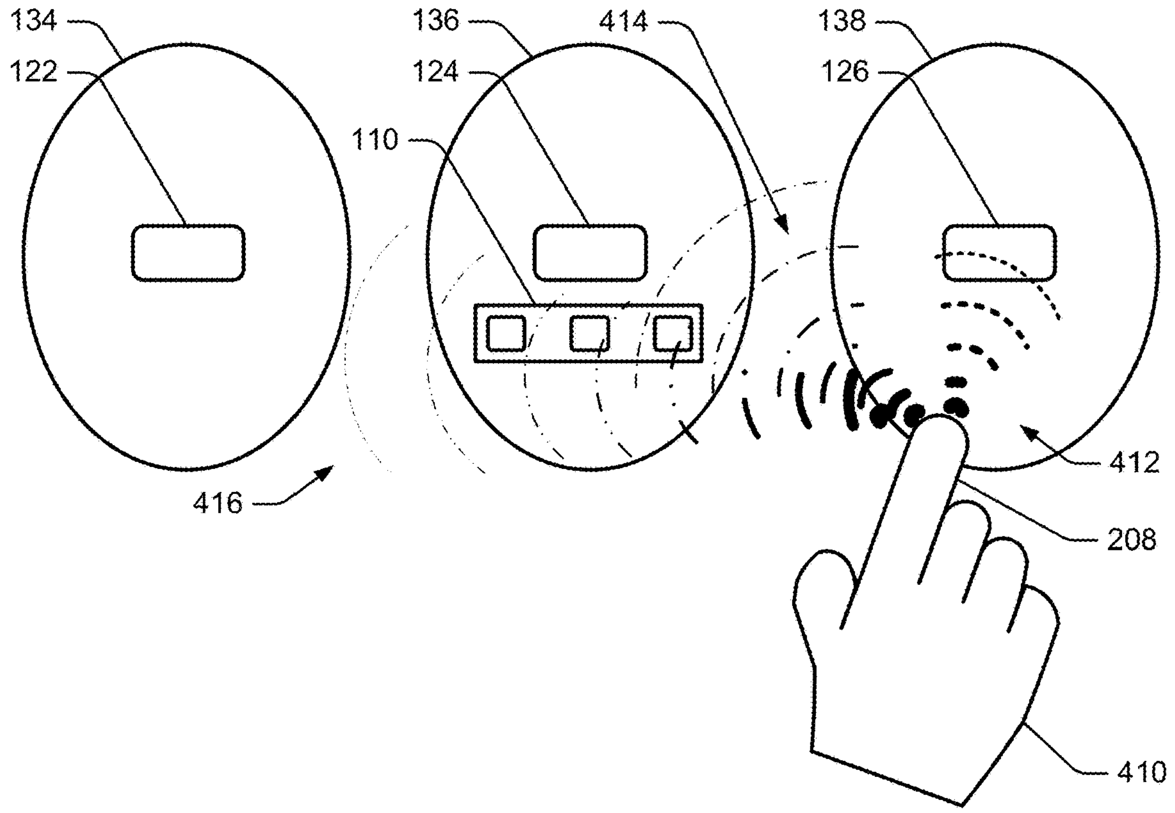

FIGS. 4A and 4B illustrate schematic diagrams of reflections of transmitted signals resulting from gestures of a user's finger 210 detectable by the radar input control system 100 of FIG. 1 corresponding with the input described with reference to FIG. 3A of the finger 210 touching the input location 144. In FIG. 4A, the finger 210 of the user is at a distance removed from the input location 144, as represented by a reduced-size version of the hand 400 to signify its distance from the input location 144. In implementations, the radar input control system 100 is configured to disregard reflections of transmitted signals below a threshold signal strength to avoid functions being triggered by unrelated movements in the ambient environment around the electronic device. The strength of the reflections is reduced when the object from which the reflections are generated is more distant from the reception antennas 122, 124, and 126 both as a result of the transmitted signal (not shown in FIGS. 4A and 4B) from the at least one transmission antenna 110 diminishing in strength by the time it reaches the object and the reflections diminishing in strength as they return from the object. Thus, if a user's finger 210 is beyond a threshold distance (represented by recognition of a minimum triggering signal strength threshold) the radar input control system 100 may be configured not to respond to any reflections from the finger 210.

Reflections 402, 404, and 406 from the hand 400 of the transmitted signal may be directed toward and potentially detectable by the reception antennas 122, 124, and 126, respectively. The reflections 402 reflected toward the reception antenna 126 (represented in dotted lines in FIGS. 4A and 4B), the reflections 404 reflected toward the reception antenna 124 (represented in a dotted and dashed line) and the reflections 406 reflected toward the reception antenna 122 (represented by a double-dotted and dashed line) all diminish in strength the further they travel from the hand 400. The diminishing strength of the reflections 402, 404, and 406 is depicted by the reflections 402, 404, and 406 being represented in thinner lines the further they are from the hand 400. In FIG. 4A, none of the reflections 402, 404, and 406 are shown to impinge upon any of the reception antennas 122, 124, and 126, respectively, to signify that none of the reflections 402, 404, and 406 have a signal strength sufficient to meet the response threshold of the radar input control system 100.

Referring to FIG. 4B, an enlarged-size version of the hand 410 signifies that the finger 210 is moved in proximity to the input location 144, resulting in different reflections 412, 414, and 416 being reflected toward the respective reception antennas 122, 124, and 126. At this position, reflections 412 from the finger 210 reflected toward the reception antenna 126 now impinge upon the reception antenna 126, signifying that the reflections 412 present a signal strength sufficient to meet the response threshold of the radar input control system 100 at the reception antenna. The reflections 412 may be the only one of the reflections 412, 414, or 416 to meet the response threshold of the radar input control system 100. Alternatively, the radar control circuitry 130 (see FIG. 1) may detect all of the reflections 412, 414, or 416 via the respective reception antennas 126, 124, and 122 and may determine that the reflections 412 are the strongest and, thus, the finger 210 from which the reflections 412, 414, and 416 originate is in closest proximity to the input location 144. Thus, the radar control circuitry 130 recognizes the gesture performed by the finger 210 as being associated with a particular command (e.g., to increase the playback volume). Thus, the radar control circuitry 130 responds by generating an output, instructing the electronic device 102 to initiate a function associated with the user performing the identified gesture relative to the discrete input location 144. In the example of FIG. 3A, for example, in determining that the finger 210 is presented at the input location 144, the increase volume function will thus be initiated by the radar input control system 100.

Figure 5A:
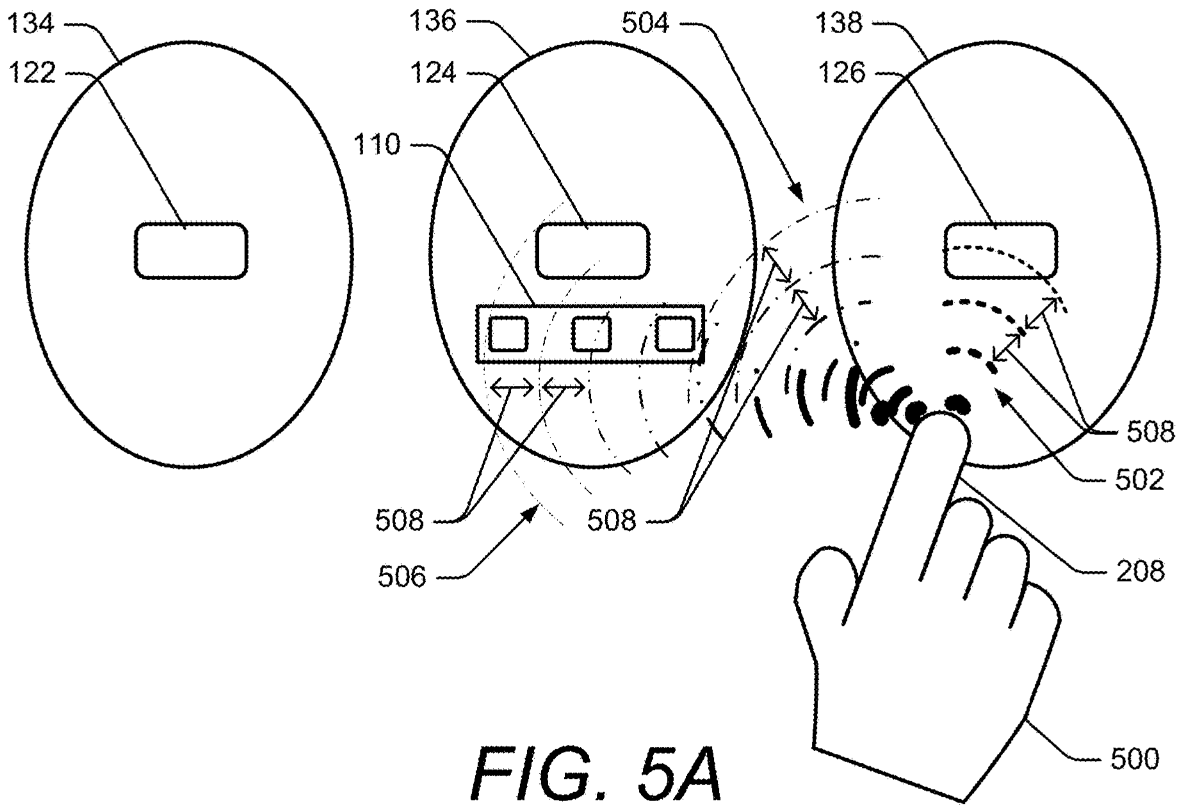
Figure 5B:
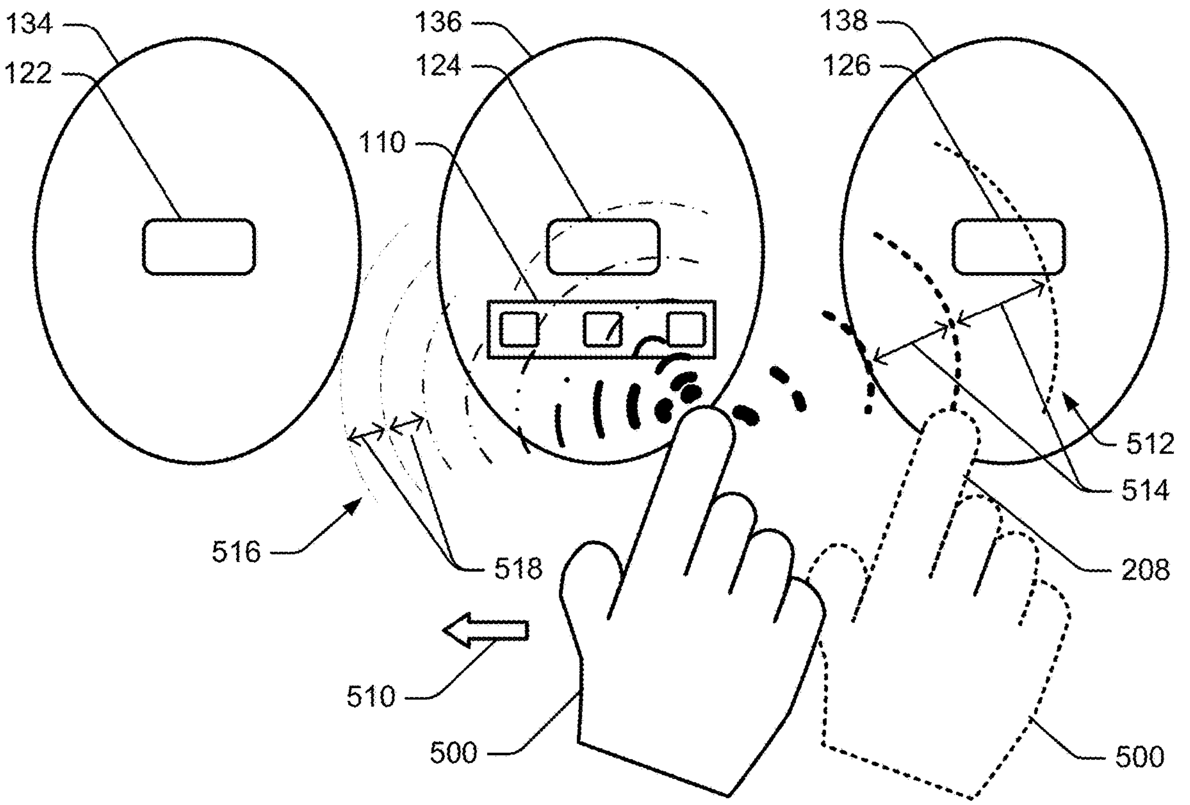

FIGS. 5A and 5B illustrate an example response by the radar input control system 100 upon receiving gestures in which the finger 210 is moved across the surface 136 of the electronic device 102 as described with reference to FIG. 3B. As shown in FIG. 5A, when the hand 500 is in a stationary position, the reflections 502, 504, and 506 reflected from the finger 210 toward the reception antennas 118, 116, and 114, respectively, may have different and diminishing signal strengths, but a wavelength 508 of each of the reflections 502, 504, and 506 is the same.

However, as shown in FIG. 5B, as the hand 500 is moved in a leftward direction 510 from its previous position (represented by a dotted line in FIG. 5B) (e.g., from right to left away from the reception antenna 126 toward the reception antenna 124) the wavelengths between the reflections changes along the motion of the hand 500 consistent with the Doppler effect. As a result, reflections 512 from the finger 210 reflected toward the reception antenna 126 have a wavelength 514 that is longer than the wavelength 508 when the hand 500 was stationary. Correspondingly, reflections 516 from the finger 210 reflected toward the reception antenna 114 have a wavelength 518 that is shorter than the wavelength 508. The radar input control system 100 can compare the wavelengths 514 and 518 to determine that the finger 210 is moving across the surface 136 and in which direction and, thus, identifies a gesture associated with a command to skip back in a media stream, as described with reference to FIG. 3B.

By including additional reception antennas along a particular dimension of the surface 136, additional inputs may be recognized by being able to differentiate more finely the position of the object from which reflections original. In the foregoing examples, a linear array of the reception antennas 122, 124, and 126 enables detection of position and movement of an object along the linear dimension of the array In addition, if one or more additional reception antennas are positioned in an orthogonal direction, a position of the object in an orthogonal direction and/or gestures involving movement in an orthogonal direction may be recognized.

Figure 6A:
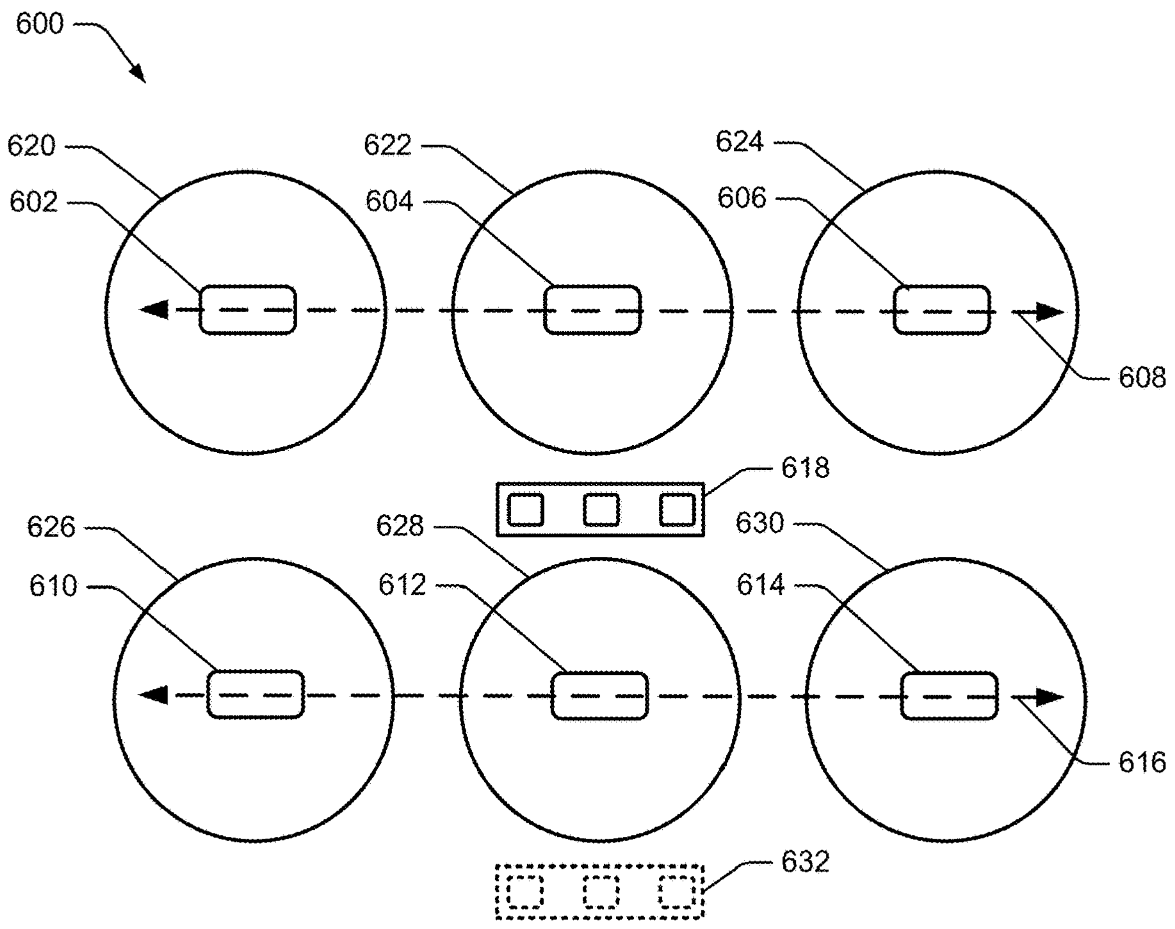
FIGS. 6A and 6B illustrate schematic diagrams of alternative implementations of radar reception antennas that may be used with the radar input control system of FIG. 1.

Referring to FIG. 6A, for example, a two-dimensional configuration 600 of reception antennas with three reception antennas 602, 604, and 606 in a first row 608 and three reception antennas 610, 612, and 614 in a second row 616 are used along with a single transmission antenna 618. This configuration would support recognition of six input locations 620, 622, 624, 626, 628, and 630 by measuring a strength of reflections received at each of the six reception antennas 602, 604, 606, 610, 612, and 614. This configuration also would support identifying gestures that include movement either across or transverse to the rows 608 and 616 by monitoring changes in wavelengths of the reflections as described with reference to FIGS. 5A and 5B. Because the reception antennas 602, 604, 606, 610, 612, and 614 are arrayed in two dimensions, Doppler measurements may be made in two directions to identify gestures moving, for example, movements to the left or right or movements up and down.

In implementations, more than one transmission antenna may be used. In addition to the transmission antenna 618, an additional transmission antenna 632 (shown in dotted lines in FIG. 6A) may be included. In an implementation including multiple transmission antennas, the signals transmitted via the transmissions antennas 618 and 632 may be staggered in time and/or polarized so that reflections resulting from the signals may be differentiated according to which transmission signal from which of the transmission antennas 618 and 632 is being reflected to help identify a location of the body from which the reflections originate.

Figure 6B:
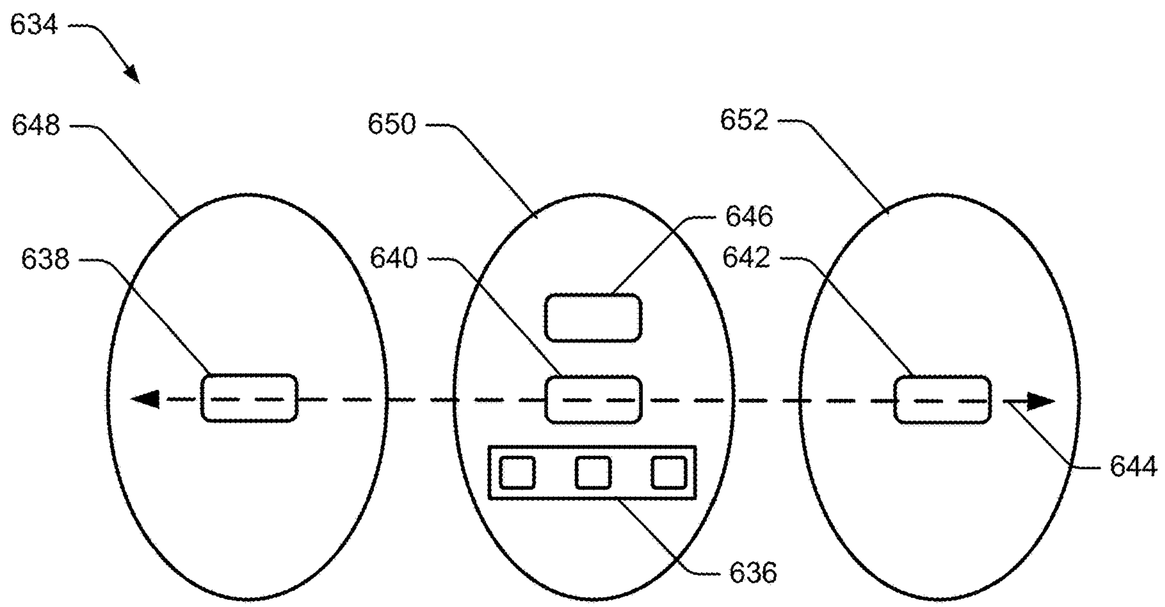

However, recognition of gestures in two dimensions also may be implemented using fewer reception antennas. Referring to FIG. 6B, an array 634 includes a single transmission antenna 636 and three reception antennas 638, 640, and 642 arranged in a linear array 644 (e.g., a one-dimensional configuration), as in the examples of FIGS. 3A through 5B. However, the array 634 also includes at least one additional reception antenna 646 that is not positioned in the linear array 644 with the other reception antennas 638, 640, and 642. Thus, reflections of transmitted signals from a transmission antenna 636 may be evaluated to determine wavelength changes in two dimensions to recognize gestures in two dimensions that may represent an input relative to input locations 648, 650, and 652.

Configuration of Radar Input Control System and Sample Applications

Figure 7:
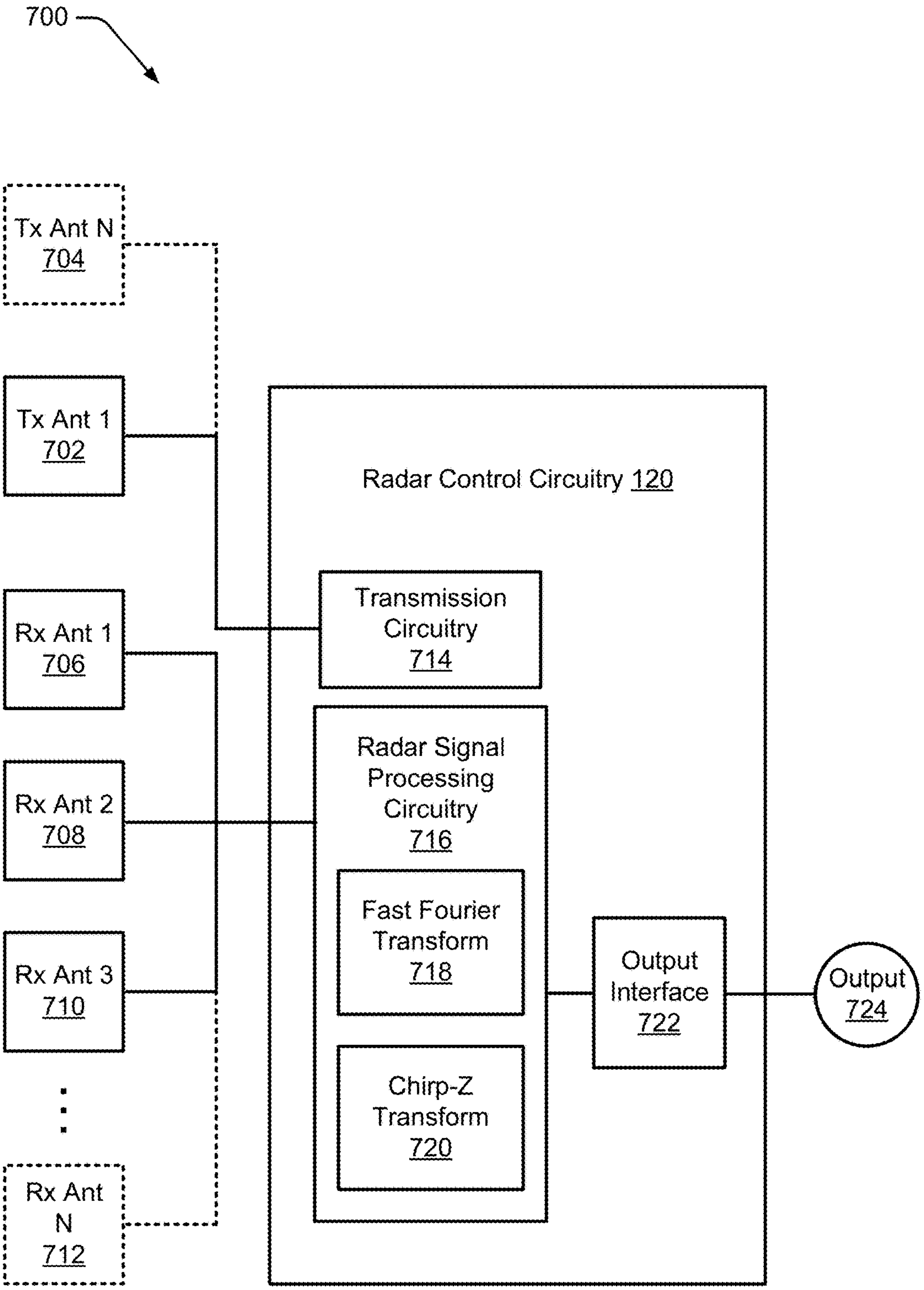
FIG. 7 illustrates a block diagram of the radar input control system of FIG. 1.

FIG. 7 illustrates a block diagram of the radar input control system of FIG. 1. In implementations, the radar input control system 100 may be implemented in different configurations to identify input gestures. For example, a radar input control subsystem 700 that may be incorporated in an electronic device 102 (see FIG. 1) includes at least one transmission antenna (Tx Ant 1) 702, and may include one or more additional transmission antennas up to Tx Ant N 704. In an implementation including multiple transmission antennas, the signals transmitted via the transmissions antennas 702 and 704 may be staggered in time and/or polarized so reflections resulting from the signals may be differentiated according to which transmission signal from which of the transmission antennas 702 and 704 is being reflected to help identify a location on a body from which the reflections originate. As previously described with reference to FIG. 1, each of the transmission antennas 702 and 704 may include one multiple emitters, or the transmission antennas 702 and 704 may include a single emitter. In addition, the radar input control subsystem 700 includes a plurality of reception antennas including reception antenna 1 (Rx Ant 1) 706, Rx Ant 2 708, Rx Ant 3 710, through Rx Ant N 712 depending on the size of the space to be monitored, the size of the electronic device, the number of inputs to be provided for radar sensing, a degree of granularity, and other factors.

In implementations, the transmission antennas 702 and/or 704 and the reception antennas 706, 708, 710, and/or 712 include printed circuit board (PCB) patch antennas. In implementations, the antennas may include flame retardant 4 (FR4) PCB antennas which are compact in size and, thus, usable in a number of electronic devices.

The transmission antennas 702 and 704 are coupled to transmission circuitry 714. In implementations, the transmission circuitry 714 generates transmission signals in a 60 GHz band (at 57-71 GHz). Radar-based devices operating in this frequency range, at these relatively short wavelengths can detect and differentiate gestures manifested by small objects to present inputs for the control of electronic devices. As previously mentioned, in implementations in which more than one transmission antenna is used, the transmission control circuitry 714 modulates the signals transmitted via the transmissions antennas 702 and 704 to stagger the transmission signals in time and/or to polarize the transmission signals so that reflections resulting from the signals may be differentiated according to which transmission signal is being reflected.

The reflections received by the reception antennas 706, 708, 710, and 712 are presented to radar signal processing circuitry 716. The radar signal processing circuitry 716 may process signals using a Fast Fourier Transforms (FFT) module 718 in order to convert time-based signals into the frequency domain to support determination of location of objects represented in the reflections received. In implementations, the radar signal processing circuitry 716, instead of applying an FFT, may utilize a Chirp-Z transform module 720. A Chirp-Z transform is a specialized, high-resolution FFT that is useful within a specified bandwidth. In the applications herein described, utilizing signals in a defined and confined bandwidth, a Chirp-Z transform is usable and desirable for its ability to identify and/or differentiate small objects, such as may be used to present inputs to an electronic device incorporating the radar input control subsystem 700.

The radar signal processing circuitry 716 identifies whether the reflections received from the reception antennas 706, 708, 710, and/or 712 are indicative of a gesture or an object at a size and/or distance such that the reflections should be disregarded as described with reference to FIGS. 2A-2C. As described with reference to FIGS. 2-5B, the radar signal processing circuitry 716 identifies whether reflections represent (i) an input and, if so, to which input location of the plurality of input locations the input is directed and/or (ii) an object being moved to present a movement-based gesture as previously described.

Upon identifying an input as a gesture and a type of gesture, the radar signal processing circuitry 716 signals an output interface 722 which then generates an output 724 corresponding to the input gesture. The output 724 may be a command to the electronic device (see FIG. 1) to decrease or increase volume, skip back or ahead in a media stream, or other functions as previously described with reference to FIGS. 3A and 3B or any other command recognized by the electronic device 102 with which the radar input control subsystem 700 is associated.

Figure 8:
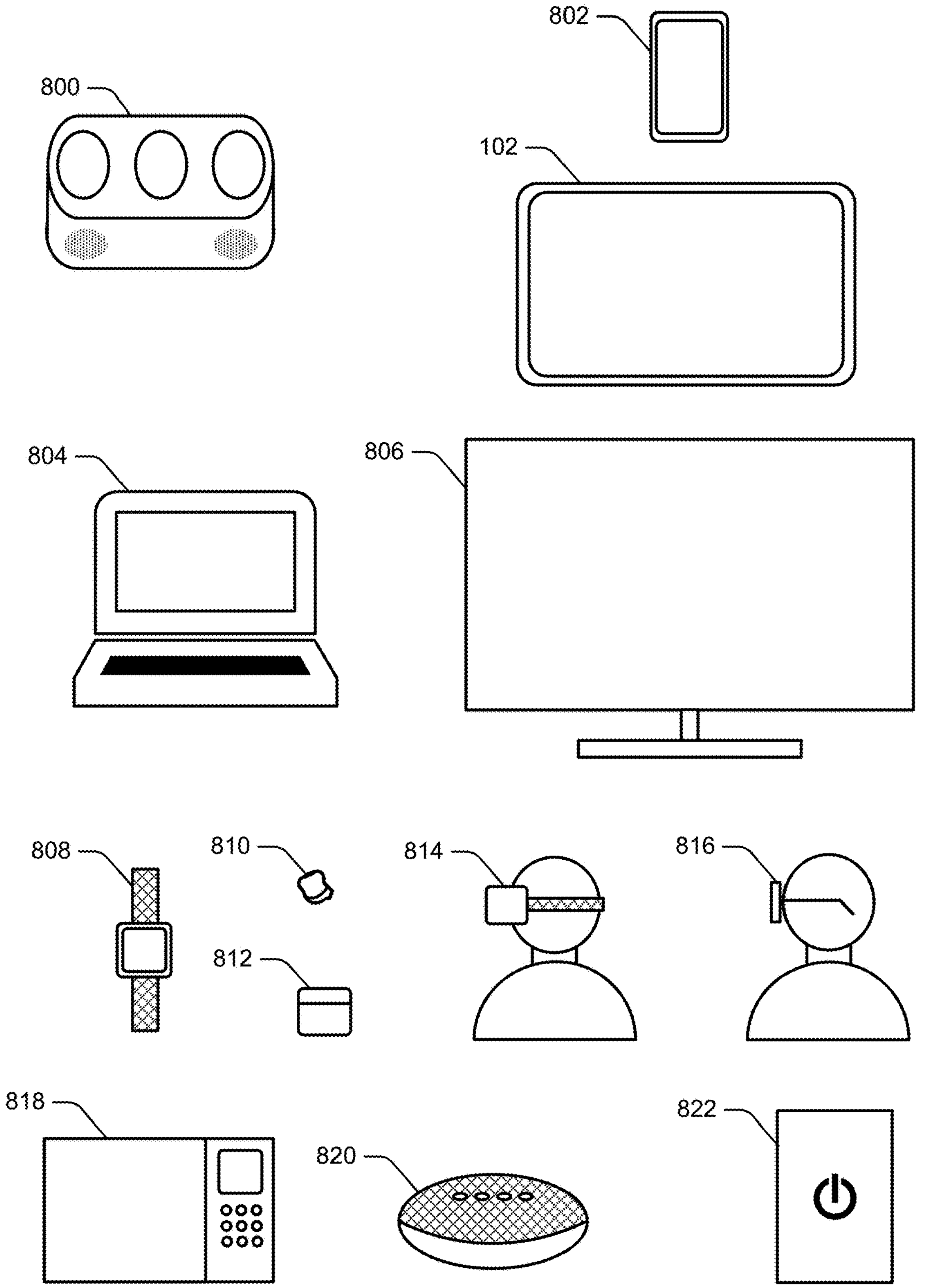
FIG. 8 illustrates perspective diagrams of electronic devices including radar input control systems.

Referring to FIG. 8, implementations of a radar input control system 100 may be employed in a variety of systems, apparatuses, and devices. Just a few examples of devices with which implementations of the radar input control system 100 may be used are described here. It will be understood that this list of examples is provided solely by way of illustration and not by limitation.

As already described, implementations of the radar input control system 100 may be included in an electronic device 102 (see FIGS. 1, 3A, and 3B) such as a docking station 800 that operates with a tablet 102, a smartphone 802, or another portable device to provide functions such as audio streaming, wireless charging, or other functions. In addition, the devices with which the docking station 800 may be used, such as the tablet 102 or smartphone 802 itself, may include implementations of the radar input control system 100, enabling a user to control the device with gestures detected by implementations of the radar input control system 100 to enter inputs, control media, make or end calls, control playback of media streams, increase or decrease volume, or any other functions.

Implementations of the radar input control system 100 may be used with other devices that currently do or not recognize touch inputs. For example, with or without a touchscreen, a portable or nonportable computer 804 may include implementations of the radar input control system 100 to operate as a pointing device or to perform other functions. Some users prefer not to use touchscreen computers because they do not want to soil or potentially harm the display by touching the display. Implementations of the radar input control system 100 enable to the user to directly engage with such a display without actually touching the display itself. In a similar fashion, implementations of the radar input control system 100 could be incorporated in a television or other visual display 806 to enable a user to change channels or media streams or otherwise control presentation of media with gestures without touching the visual display 806 and leaving marks on a screen of the visual display 806.

Implementations of the radar input control system 100 also may be included in various wearable technologies, such as a smartwatch 808, earbuds or other headphones 810 (directly or via a charging case 812), virtual reality (VR) goggles 814, or augmented reality (AR) glasses 816. Although such devices may include built in controls within easy reach of a user's hands, it may be desirable to enable gesture-based inputs that do not necessitate engaging—or having to locate—a particular interface on the device itself. For example, it may be desirable to stop an alarm or timer on the smartwatch 808 without actually touching the smartwatch 808 or controls thereon. Similarly, it may be desirable to end a call or to change media playback presented via earbuds 810 without actually pressing controls on the device itself, such as when the user's hands are dirty or when the user is wearing gloves. Such functions may be desirable to a user who would rather move their hand to present a gesture over the device than to try to find and manipulate the relevant control surface on the device. Similarly, a user may wish to control operation of VR goggles 814 or AR glasses 816 without having to fumble for controls that the user may not be able to see.

Implementations of the radar input control system 100 may also be desirable to control functions with any devices, such as starting or stopping household appliances 818, controlling media playback of a smart speaker 820, or any other household, business, or automotive device, as represented by the device control 822. For example, the device control 822 may be incorporated in a wall switch that could be recessed in a wall that would enable a user to activate, deactivate, or dim lights in a room with a gesture over the wall switch without having to actually find and touch a switch toggle.

Example Techniques for Implementing Radar Input Controls

Figure 9:
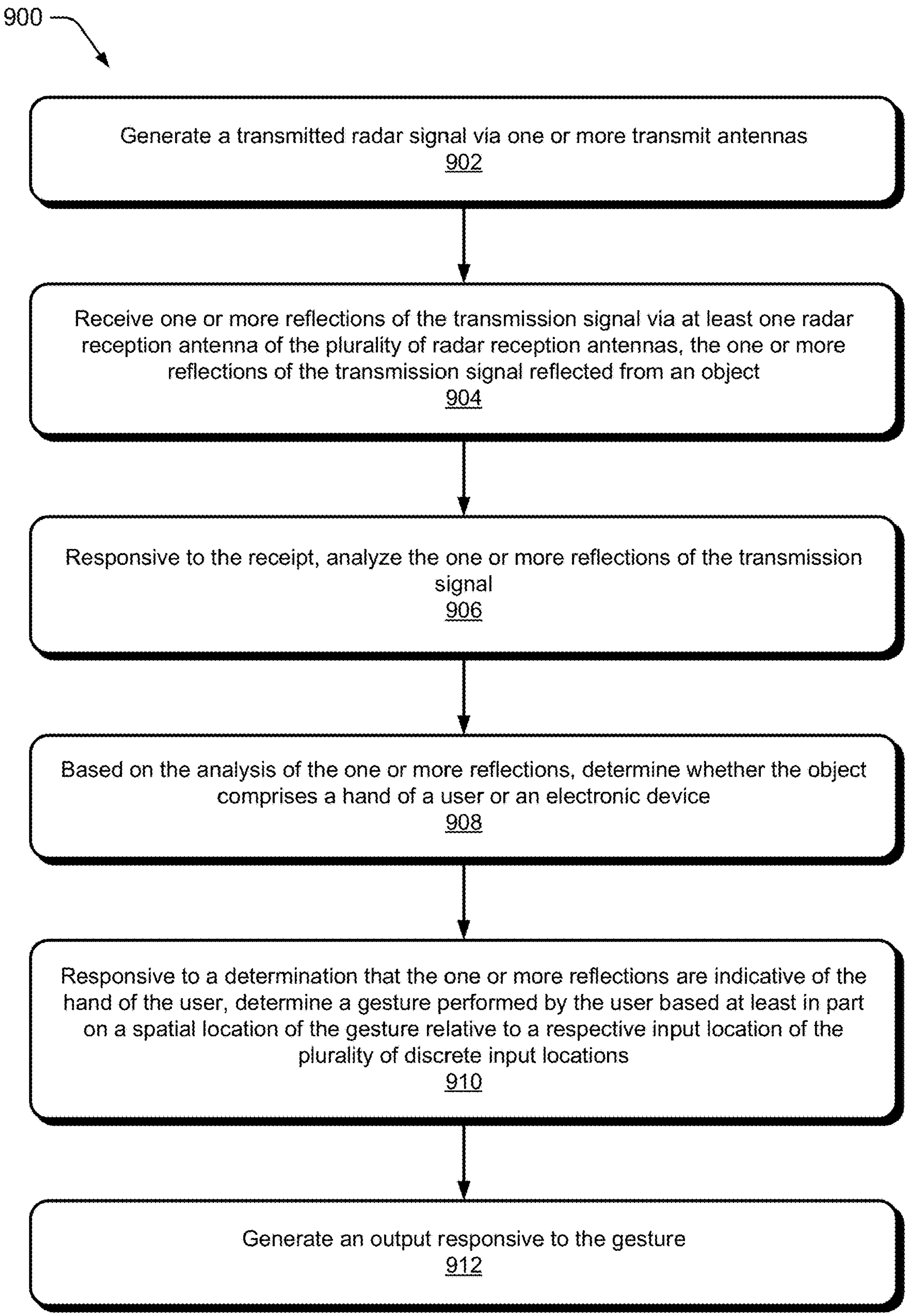
FIG. 9 illustrates a flow diagram of an example method of operation of a radar input control system.

FIG. 9 illustrates an example method 900 of implementing radar input controls with devices as previously described or any other devices. At a block 902, a transmitted radar signal is generated at one or more transmit antennas, as previously described with reference to FIGS. 1, 6A, 6B, and 7. In implementations, the transmitted radar signal may be within the 60 GHz band (at 57-71 GHz) which allows for differentiation of small objects and gestures. At a block 904, one or more reflections of the transmission signal are received via at least one radar reception antenna of the plurality of radar reception antennas in which the one or more reflections of the transmission signal reflected from an object, as also described with reference to FIGS. 2A, 2B, 2C, 3A, 3B, 4A, 4B, 5A, 5B, 6A, 6B, and 7. At a block 906, responsive to the receipt of the one or more reflections, the one or more reflections of the transmission signal are analyzed, as described with reference to FIGS. 3A, 3B, 4A, 4B, 5A, 5B, 6A, and 6B. At a block 908, based on the analysis of the one or more reflections, it is determined whether the object comprises a hand of a user or an electronic device, as described with reference to FIGS. 3A, 3B, 4A, 4B, 5A, 5B, 6A, and 6B. At a block 910, responsive to a determination that the one or more reflections are indicative of the hand of the user, a gesture performed by the user based at least in part on a spatial location of the gesture relative to a respective input location of a plurality of discrete input locations is determined, as described with reference to FIGS. 4A, 4B, 5A, and 5B. At a block 912, an output responsive to the gesture is generated to control a function of an electronic device or system, as described with reference to FIGS. 3A, 3B, 4A, 4B, 5A, 5B, 7, and 8.

This document describes systems and techniques directed at radar-based input controls for electronic devices. The radar input control system receives user inputs not provided via mechanical switches or a touchscreen interface. Thus, the surface may provide an interface to, for example, enable docking of a tablet or smartphone without concern for mechanical switches or a touchscreen interface being damaged by contact with the tablet or smartphone. Moreover, because the interface is radar-based, the surface may be nonconductive which reduces the risk of damage or discomfort caused by electrostatic discharge. These systems and techniques may be realized using one or more of the entities or components shown in FIGS. 1, 3A, 3B, 5A, 5B, 6A, 6B, and 7 and used as described with reference to FIGS. 3A, 3B, 4A, 4B, 5A, 5B, 6A, 6B, 8, and 9. Thus, these figures illustrate some of the many possible systems capable of employing the described techniques.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although implementations of systems and techniques directed at radar-based input controls for electronic devices have been described in language specific to certain features and/or methods, the subject of the appended claims is not necessarily limited to the specific features or methods described. Rather, the specific features and methods are disclosed as example implementations of systems and techniques for providing systems and techniques directed at radar-based input controls for electronic devices, such as one of the several electronic devices described herein.

What is claimed is:

1. A system comprising:

at least one transmit channel feeding one or more radar transmission antennas;

a plurality of radar reception antennas, one or more radar reception antennas of the plurality of radar reception antennas corresponding to an input location of a plurality of input locations; and radar control circuitry operatively coupled to the one or more radar transmission antennas and the plurality of radar reception antennas, the radar control circuitry configured to:

generate a transmission signal via the one or more radar transmission antennas;

receive one or more reflections of the transmission signal via at least one radar reception antenna of the plurality of radar reception antennas, the one or more reflections of the transmission signal reflected from an object;

analyze, in response to the receipt, the one or more reflections of the transmission signal;

determine, based on the analysis of the one or more reflections, whether the object comprises a hand of a user or an electronic device;

responsive to a determination that the object comprises the electronic device, not respond to an approach of the object;

responsive to a determination that the object comprises the hand of the user, determine a gesture performed by the user based at least in part on a spatial location of the gesture relative to a respective input location of the plurality of input locations; and cause an action to be performed in response to the determination of the gesture, the gesture indicative of a user command to perform a function associated with the gesture.

2. The system of claim 1, wherein the gesture includes a movement performed by one or more digits of the hand of the user being moved relative to the one or more input locations of the plurality of input locations.

3. The system of claim 2, wherein the radar control circuitry is further configured to:

determine, based on the analysis of the one or more reflections, a movement of the object when (i) the one of more reflections indicate that the object is larger than the hand of the user or one or more fingers of the hand of the user or (ii) the one or more reflections indicate that the object is beyond a threshold distance from the plurality of radar reception antennas based on at least one characteristic of the reflections.

4. The system of claim 1, wherein the transmission signal comprises a radar signal between 57 GHz and 71 GHz.

5. The system of claim 1, wherein the plurality of radar reception antennas includes three reception antennas.

6. The system of claim 5, wherein the plurality of radar reception antennas includes the at least three reception antennas in a linear array.

7. The system of claim 1, wherein the transmission antennas and the reception antennas include printed circuit board (PCB) antennas.

8. The system of claim 7, wherein the transmission antennas and the reception antennas include flame retardant 4 (FR4) PCB antennas.

9. The system of claim 1, wherein the one or more reflections of the transmission signal are represented in one or more electronic signals, and the analysis of the one or more reflections of the transmission signal comprises analyzing the one or more electronic signals, and wherein the radar control circuitry is further configured to:

analyze the one or more electronic signals using at least one of:

a Fast Fourier Transform; or a Chirp-Z transform.

10. The system of claim 1, wherein the system comprises:

a docking station configured to interoperate with an electronic device;

a tablet computer;

a smartphone;

a computer;

a television or other video display;

a smartwatch;

earbuds or headphones;

virtual reality (VR) goggles;

augmented reality (AR) glasses;

an appliance;

a smart speaker; or a control device for another system.

11. The system of claim 10, wherein the docking station includes:

a wireless charging system for the table or the smartphone; and an audio output device configured to generate audio signals produced in response to an electronic signal received from the tablet or the smartphone.

12. The system of claim 1, wherein the function associated with the gesture includes one or more of decreasing or increasing playback volume, pausing or resuming playback of content, or skipping back or ahead in a media stream.

13. The system of claim 1, wherein the determination that the object comprises the electronic device comprises identifying the object as a large object or a metallic object based on receiving strong reflections or similar reflections at the plurality of radar reception antennas.

* * * * *